United States Patent
Tavernier et al.

(10) Patent No.: US 11,933,384 B2
(45) Date of Patent: Mar. 19, 2024

(54) ADDED FRAME FOR A CONVEYOR-BELT SPLICE AND ASSOCIATED SPLICE

(71) Applicant: FP BUSINESS INVEST, Saint-Chamond (FR)

(72) Inventors: Bernard Tavernier, Le Chambon Feugerolles (FR); Frederic Guillemet, Caluire et Cuire (FR)

(73) Assignee: FP BUSINESS INVEST, Saint-Chamond (FR)

( * ) Notice: Subject to any disclaimer, the term of this patent is extended or adjusted under 35 U.S.C. 154(b) by 0 days.

(21) Appl. No.: 17/798,442

(22) PCT Filed: Mar. 19, 2021

(86) PCT No.: PCT/EP2021/057163
§ 371 (c)(1),
(2) Date: Aug. 9, 2022

(87) PCT Pub. No.: WO2021/186075
PCT Pub. Date: Sep. 23, 2021

(65) Prior Publication Data
US 2023/0115646 A1    Apr. 13, 2023

(30) Foreign Application Priority Data
Mar. 20, 2020  (FR) ...................................... 2002770

(51) Int. Cl.
*F16G 3/08* (2006.01)
(52) U.S. Cl.
CPC ...................................... *F16G 3/08* (2013.01)
(58) Field of Classification Search
None
See application file for complete search history.

(56) References Cited

U.S. PATENT DOCUMENTS 2,446,311 A * 8/1948 Traxler .................... F16G 7/00
156/140
2004/0195079 A1  10/2004 Webster et al.

FOREIGN PATENT DOCUMENTS

EP          0827575         3/1998
EP          1163459         12/2001
(Continued)

OTHER PUBLICATIONS

International Search Report issued in corresponding International Application No. PCT/EP2021/057163, dated May 21, 2021, pp. 1-4, European Patent Office, Rijswijk, Netherlands.
(Continued)

*Primary Examiner* — William R Harp
(74) *Attorney, Agent, or Firm* — HAUPTMAN HAM, LLP

(57) ABSTRACT

A splice frame intended to be attached to at least a first end portion of a conveyor belt of a type including a body made of flexible material, inside of which is housed a reinforcement including cables. The splice frame includes retaining members having at least one body configured to extend at least partially transversely with respect to the conveyor belt and anchoring members configured to engage with at least part of the cables so as to secure the body of the retaining members to the first end portion of the conveyor belt. The retaining members include a retention interface for retaining one or more fasteners of a splicing device intended for splicing the first end portion with a second end portion of the conveyor belt when a tensile force is applied between the splicing device and the conveyor belt.

11 Claims, 9 Drawing Sheets

(56) References Cited

FOREIGN PATENT DOCUMENTS

| WO | 9511393 A1 | 4/1995 |
|---|---|---|
| WO | 2014128042 A1 | 8/2014 |

OTHER PUBLICATIONS

Written Opinion issued in corresponding International Application No. PCT/EP2021/057163, dated May 21, 2021, pp. 1-5, European Patent Office, Rijswijk, Netherlands.

* cited by examiner

ADDED FRAME FOR A CONVEYOR-BELT SPLICE AND ASSOCIATED SPLICE

CROSS-REFERENCE TO RELATED APPLICATIONS

The present application is a U.S. National Phase of International Application Number PCT/EP2021/057163, filed Mar. 19, 2021, which claims priority to French Application No. 2002770, dated Mar. 20, 2020. Both of the aforementioned applications are hereby incorporated by reference in their entireties.

TECHNICAL FIELD OF THE INVENTION

The invention relates, in general, to the technical field of conveyor belt splices intended to connect the ends of at least one conveyor belt. For the sake of simplicity, the term "conveyor belt" will have, in the present description, both the meaning of a conveyor belt and that of a drive belt.

The invention relates more specifically to a frame for a conveyor belt splice of the type comprising a body made of flexible material, inside of which is housed a reinforcement comprising cables.

PRIOR ART

Conveyor belts are known to be used for conveying different materials or products, such as coal, ores, or industrial or agricultural products. These conveyor belts consist of belts made of a reinforced elastomer or a reinforced synthetic material, of suitable length and width, the ends of which must be connected to one another, before or after assembly, on supporting and driving devices comprising deflection and idle rollers. Often, these devices also comprise tensioning elements to ensure that the conveyor belt is properly tensioned.

These conveyor belts are used in particular in mines, in quarries, and other places where they are subject to severe working conditions and high internal stresses. Consequently, such conveyor belts are provided with reinforcements in the form of wires or cables, for example made of steel, arranged in the lengthwise direction of the conveyor belt and embedded in the body thereof, which is usually made of elastomer or synthetic material, to give it the resistance required for the particular application for which the belt was intended.

Many solutions exist for connecting the ends of conveyor belts. Originally, and still today, vulcanization is used when the belt is made of a reinforced vulcanizable elastomer. After preparatory work intended to create, for example, in each end, complementary profiles which are applied to one another when said ends are brought together, the vulcanization is carried out with the application of heat and vacuum, as is well known. A variant of vulcanization is cold bonding.

In the case of a cable-reinforced conveyor belt, the effect of vulcanization or heat welding by abutment does not allow the two strands of the cable reinforcement of each end to be secured together. This results in a discontinuity in the reinforcement, to the detriment of the mechanical tensile strength. Solutions consisting of an astute distribution of the cables and the ends thereof over the longitudinal extent of the connection are also known, such that, for example, the discontinuities thereof are not all aligned along the same transverse axis, which would locally and substantially weaken the conveyor belt at the splice. Such a solution, which is very common today, requires integrally stripping the end portions of all of the cables on both sides of the splice to be made, over a relatively long length, and then to create an entanglement of these portions of cable ends over a certain length, all while arranging the ends thereof in a longitudinally staggered manner along the width of the belt. In this way, two adjacent cable ends are not aligned transversely, i.e., in the width direction. Once this operation has been performed, the cables must then be embedded in the material constituting the body of the belt and a vulcanization operation is performed to finalize the splice.

The implementation of such a method is particularly constraining. First of all, the multiplicity of operations requires a very long maintenance time, in excess of one day, or even several days. In addition, the very harsh conditions of using the conveyor belt require careful work in making the splices, which can only be done by highly qualified specialists. In view of the duration of the maintenance period, several teams of people have to take turns, each of them having to be qualified. Furthermore, these splices require that the work be carried out over a very long length, several meters long, usually between 5 and 10 meters. Because the vulcanization operation must be carried out in one step over the entire length of the splice, it is necessary to be able to have a vulcanizing press on site, usually at the place where the splice is to be repaired, and to adapt said vulcanizing press to the length of the splice. The execution time and the corresponding costs are therefore very significant.

Other solutions connecting the ends of the cables, for example, by means of splices, are also known. However, here again such solutions require skilled personnel and generally require cable stripping operations in the vicinity of the end portions of the conveyor belt to be joined together, which is very time consuming to implement.

Another known connection method is the use of generally U-shaped staples cut from metal strip, which staples comprise upper and lower plates connected by hinges, these staples being secured in two series straddling each of the ends of the conveyor belt to be connected, such that the hinges protrude and those of one series can be interlocked with the hinges of t h e other series, a connecting and hinging shaft then being passed inside the interlocking hinges so as to connect the two ends, thereby forming a kind of hinge. The known means used to secure the clips to the conveyor belt ends consist of shaft-like securing means such as studs, rivets, and/or screws. These shafts have the advantage of being able to pass through the cables embedded in the conveyor belt, and therefore into the end portions to be connected together. However, experience has shown that this solution is not always satisfactory in terms of tensile strength, as the cable is subject to a high degree of unraveling. In order to minimize this unraveling effect, staples are generally used to cover the end portions of the conveyor belt over a longer length, so as to be able to spread the shaft-like securing means over a longer length of cable, such a feature being particularly constraining as it is detrimental to the flexibility of the splice when it passes over the deflection rollers.

Many other solutions have been developed in an attempt to further improve the tensile strength and flexibility of the splice, as well as to reduce the necessary maintenance time during which the conveyor belt has to remain at a standstill. For example, more recent solutions have been proposed which provide splicing devices using flat connecting elements, generally made of reinforced elastomer or synthetic material, arranged straddling one side and the other side, respectively, of the conveyor belt ends and secured to said ends to be connected. Examples of such splicing devices are given in patents EP0827575-B1 and EP-1163459-B1. These devices comprise an upper plate and a lower plate, optionally connected by a central portion. These lower and upper plates have a gap suitable for engaging with the particular end of a conveyor belt. In other words, these splicing devices comprise two pairs of opposing securing flanges, the ends of the conveyor belt being inserted between two flanges, respectively, of the same pair.

The lower and upper parts, which form splicing plates on the ends of the conveyor belt, are generally secured by means of shaft-like securing means such as rivets, pins, studs, screw-nut systems, or by cold gluing or flat vulcanizing of the flanges against the outer flat surfaces of the conveyor belt engaged between the flanges. These splicing devices are made of a flexible, elastic material, for example vulcanized rubber, or a synthetic material such as polyurethane, and they generally comprise an incorporated frame.

Such solutions are used effectively for fabric-reinforced conveyor belts. However, in the case of cable reinforcements, the problem of shaft-like securing means passing through the cables is always present: the multiplication of shaft-like securing means to minimize the local deterioration of the cables leads to a stiffening of the splice, contrary to the flexibility sought in order to pass over the deflection rollers.

There is thus a strong need, for a person skilled in the art, to achieve a more effective solution than those proposed by the prior art for splicing two ends of a conveyor belt of the type comprising a body made of flexible material, inside of which is housed a reinforcement comprising cables.

DISCLOSURE OF THE INVENTION

The object of the present invention is to provide a solution that is an evolution of existing splices for cable-reinforced conveyor belts, and that addresses some or all of the above problems.

One aim of the invention is, in particular, to propose a solution ensuring improved structural strength of the splice of such a conveyor belt in order to withstand high tensile stresses, in particular for use in the transport of various materials such as coal or ores, while providing the necessary flexibility for the passage of the deflection rollers.

The aim is also to reduce costs, by proposing a solution with a low manufacturing, storage, and distribution cost, and which is easy to implement so as not to require skilled labor and to reduce maintenance time, thereby reducing maintenance costs and downtime of the conveyor belt, in no way impairing the quality of the product obtained, i.e., maintaining or even improving the quality and strength of the splice.

To this end, the invention relates to a splice frame intended to be attached to at least a first end portion of a conveyor belt of the type comprising a body made of flexible material, inside of which is housed a reinforcement comprising cables, the frame being characterized in that it comprises retaining members having at least one body configured to extend at least partially transversely with respect to the conveyor belt and anchoring members configured to engage with at least part of the cables so as to secure the body of the retaining members to the first end portion of the conveyor belt, the retaining members comprising a retention interface for retaining securing means of a splicing device intended for splicing the first end portion with a second end portion of the conveyor belt when a tensile force is applied between the splicing device and the conveyor belt.

A frame comprising such a combination of characteristics is particularly advantageous in that it forms a structure for retaining the securing means of a splicing device, making it possible to absorb the tensile forces passing through the splice. Furthermore, a securing means of a splicing device can exert its forces on a retaining member, which is itself integral with anchoring members, at least two, engaging on two separate cables, preferably adjacent, and transversely spaced. Under these conditions, the tensile stress undergone by each anchoring means is divided at least by two with respect to the tensile stress undergone by the securing means of the splicing device, and this tensile stress of an anchoring means can be absorbed by at least two cables. The frame thus forms a means of distributing the tensile stress undergone by the anchoring means, which makes it possible to reduce the unraveling effect of the cables compared with the prior art.

Furthermore, since the anchoring members do not pass through the entire thickness of the conveyor belt splice, but only through a thickness corresponding to the thickness of the end portion obtained after a stripping operation, the flexibility of the splice is not substantially impacted.

Finally, such a frame makes it possible to directly, or even indirectly if a longitudinal space is formed between the two ends of the conveyor belt, abut the ends of the cables housed in each of the substantially transversely aligned portions. Such a splice is easier to implement and allows the length of the splice to be substantially reduced.

The retention interface of the retaining members allows the retention of securing means of a splicing device intended for splicing the first portion of the retainer with a second end portion of the conveyor belt in a splicing position in which the first and second end portions are arranged between two splicing plates of the splicing device secured together by said securing means. In such a configuration, the frame attached to at least the first end portion of the conveyor belt is separate from the splicing device. In particular, the anchoring members are separate from the securing means used to secure the splicing device, said splicing device being of the type comprising at least two splicing plates each covering a distinct side of the first and second end portions of the conveyor belt such that the first and second end portions of said conveyor belt are arranged between the two splicing plates, the splice plates being secured together by securing means. In this way, the retention interface(s) ensure(s) a retaining function for the securing means of the splicing device, when a tensile force is applied between the splicing device and the conveyor belt. The attached frame thus ensures a reinforcing function for at least the first end portion of the conveyor belt in order to retain the splicing device when subjected to tensile forces.

Preferably, the anchoring members each comprise a shaft configured to pass through the first end portion. These shafts may be stud anchoring tabs forming the retaining member, or, for example, a shaft of a screw forming a retaining member.

Preferably, the frame has a rigid structure. Such a structure allows better retention than a flexible structure, such as a cable.

Preferably, the anchoring members and/or the body of the retaining members are metallic.

According to one embodiment, the retention interface of at least some of the retaining members is supported by the body of said retaining members. This simplifies the structure of the frame. In one advantageous configuration, the retention interface has a concave surface forming an impression oriented or open longitudinally so as to support at least one securing means. This support forms a receiving cradle for a securing means, allowing a uniform distribution of the forces absorbed by the cables in which the associated anchoring members are engaged.

According to one embodiment, at least a plurality of retaining members is connected together along an axis intended to extend transversely with respect to the conveyor belt. Such a feature facilitates the installation of the retaining members by the operators. This makes it possible to connect a plurality of retaining members at the same time. In addition, an integral connection in the transverse direction of the conveyor belt allows the flexibility of the belt to be maintained.

According to one embodiment, the frame comprises at least one support plate configured to cover at least part of a same side of the first end portion and of the second end portion of the conveyor belt, the support plate comprising at least some of a plurality of retaining members arranged in a predetermined pattern, for example in a staggered pattern. Preferably, the pattern will be chosen to ensure a homogeneous distribution of the tensile forces over the extent of the end portions of the cables. The purpose of such a support plate is to secure or connect together at least some of the retaining members also in the longitudinal direction of the conveyor belt, without impairing the flexibility. In this way, by using such a support plate, preferably made of the same flexible material as that of the body of the conveyor belt, it is possible to connect, in a single operation, a plurality of retaining members which are pre-positioned on said support plate so as to come to their corresponding place on the associated end portion.

According to one embodiment, the distance separating two anchoring members of a retaining member corresponds to a distance separating two cables of the first end portion of the conveyor belt. In this way, the retaining members are connected to two separate, adjacent cables. More generally, a distance separating two anchoring members of a retaining member may be chosen is configured to correspond substantially to a multiple of the distance separating two cables from the first end portion of the conveyor belt.

In one embodiment, at least some of the anchoring members of at least some of the retaining members comprise studs, having anchoring tabs located in the extension of the body of the associated retaining member, each stud preferably being formed in one piece.

In one embodiment, the body of the retaining members comprises an upper part and/or a lower part connected together by the anchoring members, the lower and/or upper parts of the body of the retaining members being intended to come from one side or the other of the first end portion of the conveyor belt, depending on the thickness thereof. Such a configuration further allows on the corresponding end portion of the conveyor belt to be clamped with a pressure distributed over a larger surface. Such a pressure reduces the transmission of forces through the anchoring member into the cable since the tensile forces are then absorbed both by the cable retaining the anchoring member and by the material of the clamped end portion between the upper part and the lower part of the retaining member.

According to one embodiment, a first of the two parts consisting of the upper part and the lower part of the body of the retaining member comprises at least one recess, such as a countersink, suitable for receiving a head of one of the anchoring members, and the second of the two parts comprises at least one anchoring interface, such as a threaded hole, with which an anchoring portion of said anchoring member is suitable to cooperate.

According to one embodiment, a first part of the upper part or the lower part comprises at least one indentation suitable for accommodating at least a part of a head or a part of a central transverse shaft of an anchoring member, such as a stud. According to a complementary or alternative embodiment, a second part from among the upper part or the lower part comprises at least one indentation suitable for accommodating at least part of the ends of the anchoring members, preferably curved under the part.

According to a second aspect, the invention also relates to a conveyor belt extending along a longitudinal axis comprising a body made of a flexible material, inside of which is housed a reinforcement comprising cables which extend axially at least in part, the conveyor belt comprising a first and a second end portion connected together by a splice device comprising at least two splice plates each covering a separate side of the first and second end portions of the conveyor belt such that the first and second end portions of said conveyor belt are arranged between the two splicing plates, the splicing plates being secured together by securing means, the splice being characterized in that it comprises at least one splice frame as described above attached to the first end portion and the second end portion, and configured to retain the securing means of the splicing device when a tensile force is applied between the splicing device and the conveyor belt.

According to another aspect, the invention also relates to a method of manufacturing a conveyor belt splice as described above, characterized in that it comprises at least the following steps:

stripping an upper part and a lower part of the conveyor belt body at the first end portion and the second end portion of the conveyor belt;

installing at least one splice frame attached to the first end portion and the second end portion of the conveyor belt;

installing the splicing device so as to join the first and second end portions of the conveyor belt.

Such a method is particularly advantageous in that it is easy to carry out by one person, without the need for special skills.

According to one embodiment, the step of stripping an upper part and a lower part of the body of the conveyor belt at the first end portion and the second end portion of the conveyor belt corresponds to a material removal operation in the flexible material body of the corresponding end portion, said material being located on a layer or outer and inner peripheral layer of the associated end portion, surrounding a central layer within which are located reinforcements, such as the cables. The central layer is then not stripped during this step since the method does not require the removal of all the material around the cables of the end portion, which saves a considerable amount of time, reducing maintenance costs and downtime of the conveyor belt.

BRIEF DESCRIPTION OF THE FIGURES

Further features and advantages of the invention will become apparent from the following description, with reference to the appended figures, which illustrate.

For clarity, identical or similar elements are marked with identical reference signs in all figures.

In the description and the claims, to clarify the description and the claims, the terms longitudinal, transversal and vertical will be adopted, on a non-limiting basis, with reference to the X, Y, Z axes shown in the figures.

DETAILED DESCRIPTION OF AN EMBODIMENT

Figure 1A:
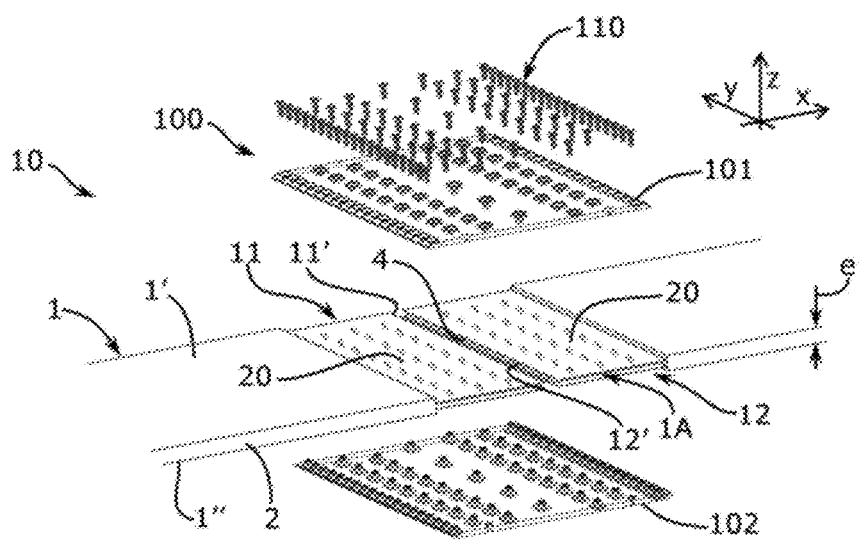
FIG. 1A: an exploded view of a conveyor belt splice according to a first embodiment.
Figure 1B:
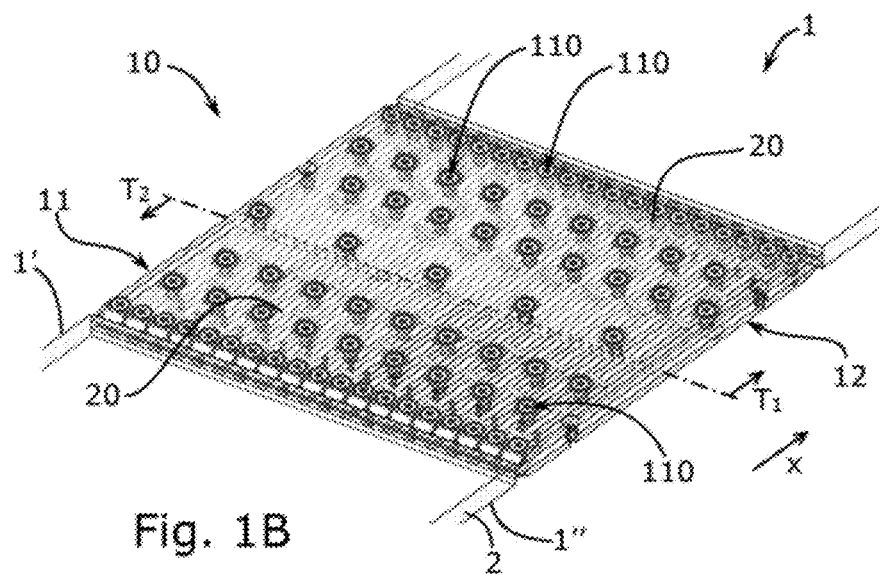
FIG. 1B: a top perspective view of the splice assembled according to this first embodiment.
Figure 2:
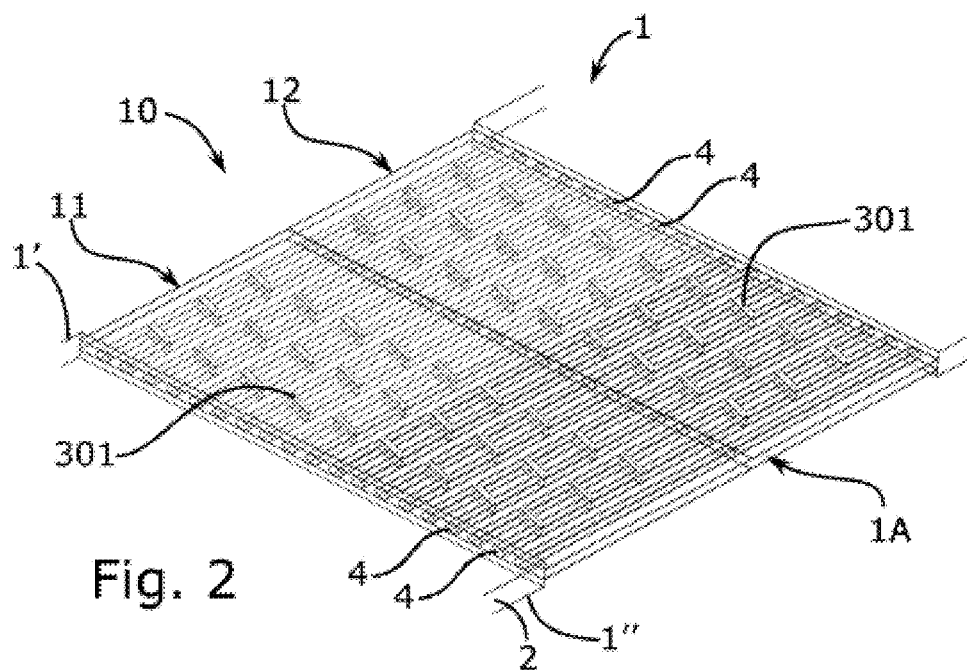
FIG. 2: a view of a first end portion and a second end portion of the conveyor belt, each provided with a frame according to this first embodiment.

FIGS. 1A, 1B, and 2 illustrate a splice 10 of a conveyor belt 1 according to a first embodiment. The conveyor belt 1 extends along a longitudinal axis X, generally corresponding to the direction of travel thereof along a conveyor belt. The conveyor belt 1 comprises a body 2 made of a flexible material, such as a vulcanizable elastomer or a synthetic material, reinforced with a reinforcement 3 comprising cables 4 embedded in the body 2. The forces absorbed by the conveyor belt 1 are mainly longitudinal, such that the cables 4 are arranged in the body 2 of the conveyor belt 1 extending axially and that said cables work in traction during the use of said conveyor belt 1.

The conveyor belt 1 has a first end edge 11' and a second end edge 12', from which a first end portion 11 and a second end portion 12 extend over the conveyor belt 1 and are spliced together by a splicing device 100, ensuring the splice 10 of the two end portions 11, 12. It should be noted in practice that, taking into account the distances for conveying different materials or different products according to the uses in quarries or other places of use, a single conveyor belt 1 may be formed by splicing a plurality of longitudinal conveyor belt portions spliced together by a splicing device 100.

The end portions 11, 12 are configured such that, in the spliced position, the splice 10 at the splicing device 100 is of equal thickness to the conveyor belt 1. In this way, the use of the splicing device 100 does not create a local excess thickness at the end portions 11, 12 thereof, the thickness being constant. Such a feature is particularly important to avoid premature wear due to the passage of scrapers on the conveyor. In order to satisfy this constraint, the first end portion 11 and the second end portion 12 are thinned, in particular after having been stripped by a stripping operation, to ensure the installation of the splicing device 100. This stripping preferably extends in thickness to the cables 4, i.e., to a thickness corresponding to the thickness of the cables 4.

The conveyor belt 1 houses the reinforcing cables 4 in its body 2. The conveyor belt 1 is structured so as to comprise, in the direction of its thickness e, a substantially central layer 1A that integrates the cables 4, interposed vertically between two outer layers of flexible material of the body 2 without reinforcement 3, namely: an upper part and a lower part of the body 2 of the conveyor belt 1.

Each of the cables 4 of the conveyor belt 1 extends longitudinally in the body 2 of the conveyor belt 1 continuously into the corresponding end portion, where the loose and severed end of each cable 4 is located. The end portions 11, 12 are formed, in the longitudinal extension of the conveyor belt, of the central layer 1A integrating the cables and stripped of the outer layers, i.e., stripped of the lower and upper layers of material normally located, on the rest of the conveyor belt beyond the splice 10, on either side of the central layer 1A. The thickness of the end portions 11, 12 corresponds to the thickness of the central belt 1A obtained after the stripping operation, and preferably equal to an average diameter of the cables 4 or to the diameter of the biggest cable 4. A perfect stripping of each cable, corresponding to the complete removal of all the material of the body 2 surrounding the cables 4, and in particular the material of the body 2 between the cables 4, is therefore not necessary.

The splicing device 100 for splicing the two end portions 11, 12 comprises two splicing plates 101, 102, each sized so as to cover, over all or part of the width of the conveyor belt 1 and preferably over the entire width, the first end portion 11 and the second 12 on the same side of the conveyor belt 1. The splicing plates 101, 102 comprise a lower splicing plate 101 straddling the first and second end portions 11, 12 and a lower splicing plate 102 straddling the first and second end portions 11, 12 so as to overlap them. These splicing plates 101, 102 each have a thickness complementary to that of the corresponding end portion configured to jointly fill the material removal caused during the stripping step to thin the first end portion 11 and the second end portion 12. In this way, after splicing, the splice 10 is flush with the lower 1" and upper 1' surfaces of the conveyor belt 1, i.e., the thickness e of the conveyor belt 1 is constant, without relief. As already mentioned above, such a feature makes it possible to avoid premature wear due to the use of scrapers (not illustrated) located in the path of the conveyed materials and configured to scrape the upper surface 1' of the conveyor belt 1.

The first and second end portions 11, 12 of said conveyor belt 1 are caught or clamped between, vertically, the two splicing plates 101, 102 which each create a material bridge between the first and second ends 11, 12. Said splicing plates 101, 102 are made of a flexible and elastic material, for example of vulcanized rubber, or of a synthetic material such as polyurethane, and may comprise an embedded frame, for example a textile frame. Said material is preferably the same flexible material as that constituting the body 2 of the conveyor belt 1.

The lower 101 and upper 102 splicing plates are secured by shaft-like securing means 110 such as rivets, pins, studs, and/or screw-nut systems. The securing means 110 pass through the thickness and successively: a first of the two splicing plates 101 or 102, then one of the two end portions 11 or 12, and finally the second of the two splicing plates 101 or 102. In this first embodiment, the securing means 110 are screws each comprising a head 111 and an anchoring portion 112 provided with a thread, the splicing plates 101, 102 comprising first interfaces 113 for cooperating with the heads 111 of the securing means 110 and/or second interfaces 114 for cooperating with the anchoring portions 112 of the securing means 110. The first and second interfaces 113, 114 are carried by inserts which are embedded in the connecting plates 101, 102 or which are added (e.g., a washer 115). Preferably, the insert carrying the second interface, here the threaded insert, locally matches a portion of a cable 4 or a group of cables 4, for example by following the same curvature, which allows for a large amount of clamping without deforming it (see FIG. 5).

The first interfaces 113 comprise vertically drilled washers 115, each comprising an impression suitable for receiving a head 111 of one of the securing means 11. In such a configuration, the washers 115 forming first interfaces 113 thus form attachments associating around and complementary to a hole in the upper splicing plate 101, suitable for being passed through by the securing means 110. These washers 115 each have, on the periphery thereof, points oriented toward the splice plate which supports it in order to penetrate and engage with said splice plate. Alternatively, or in combination, for example in the case where different first interfaces 113 are integrated together in the same splicing plate, these washers 115 can be incorporated into the splicing plate 101, i.e., embedded in the flexible and elastic material such as, for example, the vulcanized rubber forming the associated splicing plate.

The second interfaces 114 comprise a cylindrical tubular portion 116, an inner cylindrical surface of which is suitable for cooperating with the anchoring portion 112 of the securing means 110, by means of a threaded hole complementary to the thread of the anchoring portion 112.

In accordance with the invention, the splice 10 comprises a splice frame 20 attached to the first end portion 11 and another frame 20 attached to the second end portion 12. These frames 20 are configured to retain all or part of the securing means 110 of the splicing device 100 when a tensile force is applied between the splicing device 100 and the conveyor belt 1.

In particular, the frames 20 are attached to the first and second end portions 11, 12, which are thinned in thickness, this being after a step of stripping the first end portion 11 and the second end portion 12 of the conveyor belt 1, as a result of which the central layer 1A is stripped, which central layer integrates the cables, the thickness of the end portion 11, 12 preferably being reduced to that of the cables 4, and prior to the installation of the splicing device 100 by means of which the two splicing plates 101, 102 are superimposed straddling the first and second end portions 11, 12 of the conveyor belt 1 provided with said frames 20.

The frames 20 comprise retaining members 30 comprising a plurality of studs 301. Each stud 301 has a general "U" shape before it is secured to the conveyor belt. A stud 301 is formed from a one-piece, preferably metal, shaft. The body 31 of the studs 301 is formed from a central transverse portion of the shaft forming a retention interface 32, said body 31 being configured to extend transversely with respect to the conveyor belt 1. The central portion of the shaft is interposed between two lateral shaft portions forming the anchoring members 40. In other words, each stud 301 comprises anchoring tabs 33 formed from extensions of the central portion of the shaft, namely on either side of the body 31.

These anchoring members 40, here the anchoring tabs 33, are each shaft-like and comprise points and the ends thereof in order to facilitate their insertion into the associated end portion 11, 12 to pass vertically through the thickness thereof. The tips of the anchor tabs 33 of each stud 301 are bent or curved under the corresponding end portion 11, 12 after insertion to lock the stud 301 into place once installed and ensure that it cannot be removed during operation of the conveyor belt 1.

The retention interface 32 of the retaining members 30 is configured to retain securing means 110 when a tensile force is applied between the splicing device 100 and the conveyor belt 1. The retention interface 32 is supported by the body 31 of said retaining members 30. The anchoring tabs 33 of the same stud 301 are anchored in two separate cables 4 of the same corresponding end portion 11, 12, the cables 4 extending axially with respect to the conveyor belt 1. The body 31 of each stud 301 is then positioned at least in part transversely between two adjacent cables 4 forming a connecting bridge between the two cables 4, therefore also transversely along an axis Y with respect to the conveyor belt 1. The two anchoring tabs 33 of the same stud 301 are spaced apart by a distance d equal to a distance separating the central axes of two cables 4 of the corresponding end portion 11, 12 (see FIG. 5). More generally, this distance d is chosen so as to be a multiple of an average spacing between two cables to ensure a homogeneous distribution of the cables along the width of the conveyor belt 1. Of course, variants may be possible, such as a stud with more than two anchoring tabs 33, for example three, each anchoring in one of three adjacent cables.

The studs 301 of each of the frames 20 are distributed homogeneously over each of the two end portions 11, 12 in a suitable pattern. Each of the two end portions 11, 12 must comprise sufficient retaining members 30 to ensure its function of retaining the securing means 110 of the splicing device 100 when a tensile force is applied to the belt, but not too much so as not to significantly degrade the flexibility of said conveyor belt 1 at the splice 10.

When the conveyor belt 1 is being used, it moves longitudinally so as to transport the different materials or products. This transport involves a resistance force in the conveyor belt 1 which works in traction. In particular, at the splice 10, the tensile forces tend to move the first end portion 11 away from the second end portion 12, which are then retained relative to one another by the splice device 100. When subjected to such a tensile force, one of the two end portions 11, 12 applies a pulling force on the securing means 110 of the securing device 100 which passes through them, the securing means 110 being held by the splicing plates 101, 102 of the connecting device 100, themselves held by the other of the two end portions 11, 12, preferably symmetrically with respect to a vertical splicing plane parallel to the transverse axis Y located between, or even containing, the two end edges 11', 12'. The splicing plates 101, 102 of the splicing device 100 are thus subjected to high tensile stresses, and the securing means 110 make it possible to maintain the axial separation of the end portions 11, 12 from one another. The frame 20 forms a reinforcement of the associated end portion 11, 12 by absorbing the tensile forces of the screws 110 which come to bear against the retention interfaces 32 of the retaining members 30 placed in their path during traction. Such supports are illustrated in detail with reference to FIGS. 6A, 6B, 6C, and 7, according to different variants.

Each retaining member 30 is arranged longitudinally between at least one of the securing means 110 and one of the end edges 11', 12' of the conveyor belt 1, i.e., the associated end portion 11, 12. In this way, the securing means 110 are retained by the retaining members 30 so as to bear, directly or indirectly, against at least one of the retention interfaces 32. Moreover, these retaining means 30 are secured to at least two distinct cables 4, preferably two adjacent cables 4 as illustrated in this embodiment. In this way, each retaining member 30 forms an obstacle to the longitudinal displacement of the screws 110 during the application of the tensile forces of the associated end portion 11, 12 with respect to the splicing device 100. Such a feature contributes to reinforcing the connection between the two end portions 11, 12, thereby reinforcing the splice 10.

The retention interfaces 32 carried by the retaining members 30 that are anchored in the first end portion 11, retain the securing means 110 of the splicing device 100 in a first traction direction T1 (see FIG. 1B). The retention interfaces 32 carried by the retaining members 30 that are anchored in the second end portion 12 in turn retain the securing means 110 of the splicing device 100 in a second traction direction T2, opposite to the first traction direction T1. Thus, when a tensile force is applied between the splicing device 100 and each end of the conveyor belt 1, the frames 20 contribute to maintaining the relative longitudinal spacing of the end portions 11, 12 and the structural strength of the ends of the conveyor belt 1 and of the splice 10 is ensured in order to withstand significant tensile stresses. Furthermore, since the retaining members 30 are located only at the thinned end portions 11, 12, the impact of said retaining members 30 on the flexibility of the belt is reduced. Finally, even though the shaft-like securing means 110 pass through the reinforcing cables 4, the tensile force of a single securing means 110 is distributed over at least two cables, which reduces the absorption of tensile force per cable 4, which limits the effect of unravelling.

In this embodiment, the retaining members 30 are arranged in a plurality of, in particular three, separate transverse alignments or rows per end portion 11, 12. The retaining members 30 are further arranged in a plurality of longitudinal alignments per end portion 11, 12, each longitudinal alignment of an end portion 11, 12 being aligned with a longitudinal alignment of the other end portion 12, 11. Each retaining member 30 is secured to two separate adjacent cables 4. One cable is here connected by the retaining means 30 to a single adjacent cable, such that the cables are connected in independent pairs. In such a configuration, one of the cables on a side edge may not have any retaining members passing through it if the end portion of the end portion 11, 12 comprises an odd number of cables. In general, such a configuration is interesting in that it maintains a good flexibility of the splice 10 to promote troughing of the conveyor belt 1. Of course, such a distribution of the retaining members 30 may be different. For example, the retaining members 30 comprising the studs 301 may be arranged in a staggered manner, so that they are positioned in, for example, three separate transverse alignments or rows per end portion 11, 12, the studs 301 being shifted from one row to the other by a step corresponding to an average space between two cables 4. This distribution also depends on the pattern formed by the securing means 110 on the splicing device 100.

It should be noted that this first embodiment provides securing means 110 passing through the two connecting plates 101, 102 of the connecting device 100 along a central row, without crossing either of the end portions 11, 12, but passing through a longitudinally delimited space between the two end edges 11', 12' of the conveyor belt 1. It should be noted that in an alternative embodiment, the two end portions 11, 12 may be abutted in the splice. In this case, if a central row of securing means 110 is provided, said securing means 110 of this row pass through one of the end portions which has a suitable length, slightly greater than that of the other end portion. In yet another variant, the two splicing plates 101, 102 are joined at the center thereof by a material splice forming an "H" profile of the splicing device 100, which splice may be formed in one piece with either of the two connecting plates 101, 102, or form an insert.

Two rows of securing means 110 are arranged so as to border the longitudinal ends of the splice device 100, and further comprise a protective edge projecting longitudinally toward the outside of the splice 10 from the first interfaces 113, here the washers 115. The two edges longitudinally delimiting the upper splicing plate 101 are then reinforced, which limits the risk of wear that could create a relief, and thus the risk that the splicing plate could come into the path of any scrapers. Of course, such a reinforced edge may be applied in addition to, or as an alternative, to the lower splicing plate 102.

FIGS. 3, 4A, 4B, 5, 6, and 7 illustrate other embodiments that differ from the first embodiment, particularly in that the splicing device 100 is configured such that each securing means 110 comes to bear against separate retaining members 30 positioned in their path during traction. The pattern formed by the arrangement of the securing means 110 connecting the two splicing plates 101, 102 and passing through a corresponding one of the end portions 11, 12 is thus associated and similar to that of the retaining members 30. The distribution of the securing means 110 then depends on that of the retaining members 30. Such a structure provides improved tensile strength. These embodiments are devoid of a central row of securing means 110.

On the contrary, in the first embodiment illustrated in FIGS. 1A and 1B, the securing means 110 of the splice device 100 are not perfectly aligned longitudinally, two by two, with each of the retention interfaces 32 of the retaining members 30. The pattern formed by the retaining members 30 on the first and second end portions 11, 12 may be selected such that a majority, and not necessarily all, of the securing means 110 of the splicing device 100 are retained by, and longitudinally aligned with, the retaining members 30 by bearing directly or indirectly against at least one retention interface 32. Such an embodiment is practical in the case where the frames 20 and the splicing device 100 are secured under difficult conditions, or even the precision of the assembly is not perfect. This reduces the time required to install the frame 20. In this case, the retaining effect is still ensured, even though some of the securing elements 110 can be arranged through a cable 4 and/or offset from a retaining member 30 of the frame 20. In such a configuration, the arrangement of the securing means 110, here the screws, randomly with respect to the step of the cables of the belt 1 preferably combines coming to bear on the retaining members 30, tightening said screws 110 on the belt, and passing some securing means 110 through the cables.

Figure 3:
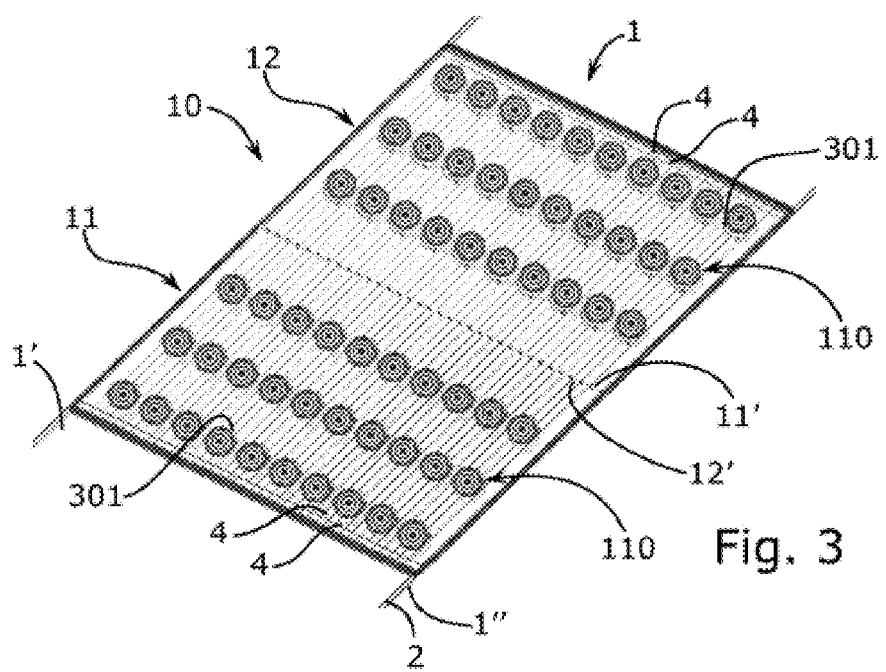
FIG. 3: a top perspective view of the splice assembled according to a second embodiment.
Figure 4A:
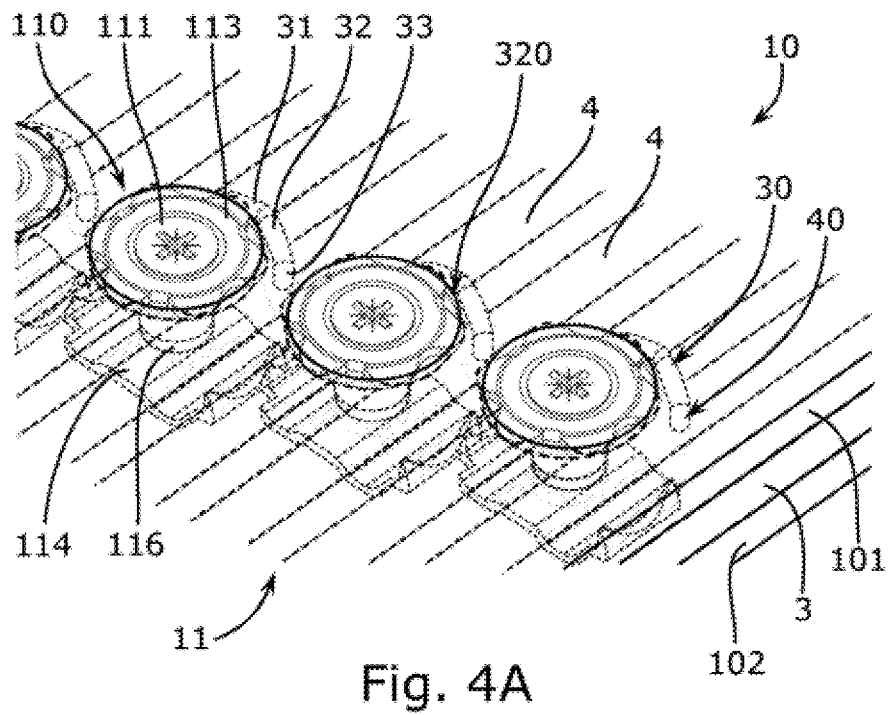
FIG. 4A: a detail of FIG. 3.

With reference to FIGS. 3 and 4A, this second embodiment illustrates retaining members 30 of the stud type 301 comparable to the first embodiment, with the difference that their retention interface 32 has an indentation 320 oriented or open longitudinally. This indentation 320 forms the retention interface 32 allowing for at least one of the securing means 110, here only one, to be received in support, directly or indirectly. This support forms a reception cradle for a shaft-like securing means 110, in particular the shaft itself, minimizing relative transverse movements between the associated end portion and the splicing device 100 and allowing a uniform distribution of the forces absorbed on the two cables in which the associated stud 301 is anchored thanks to the anchoring members 40, in particular here the anchoring tabs 33.

Figure 4B:
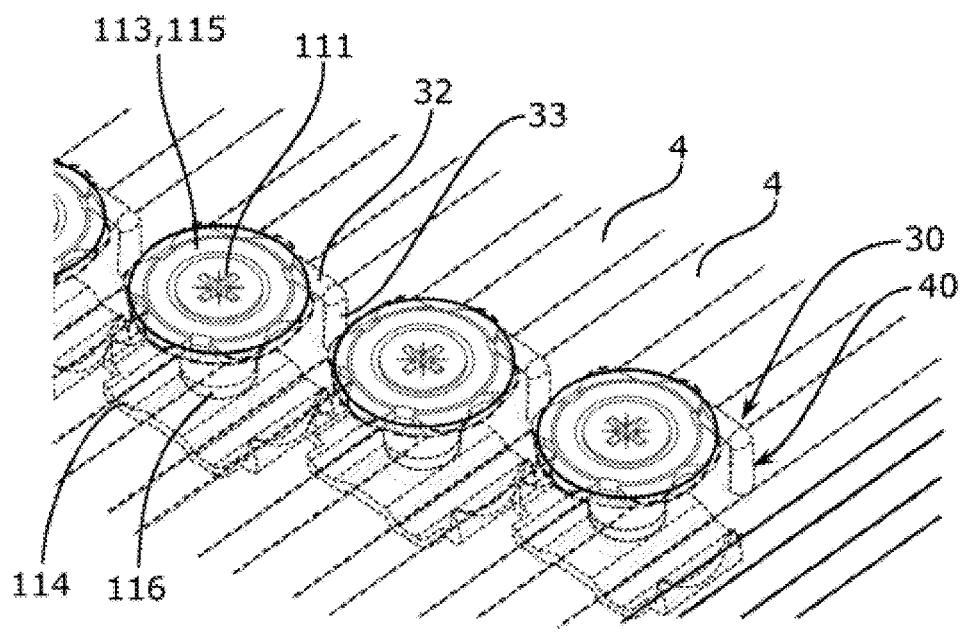
FIG. 4B: a detailed partial top perspective view of the splice assembled according to a third embodiment.
Figure 5:
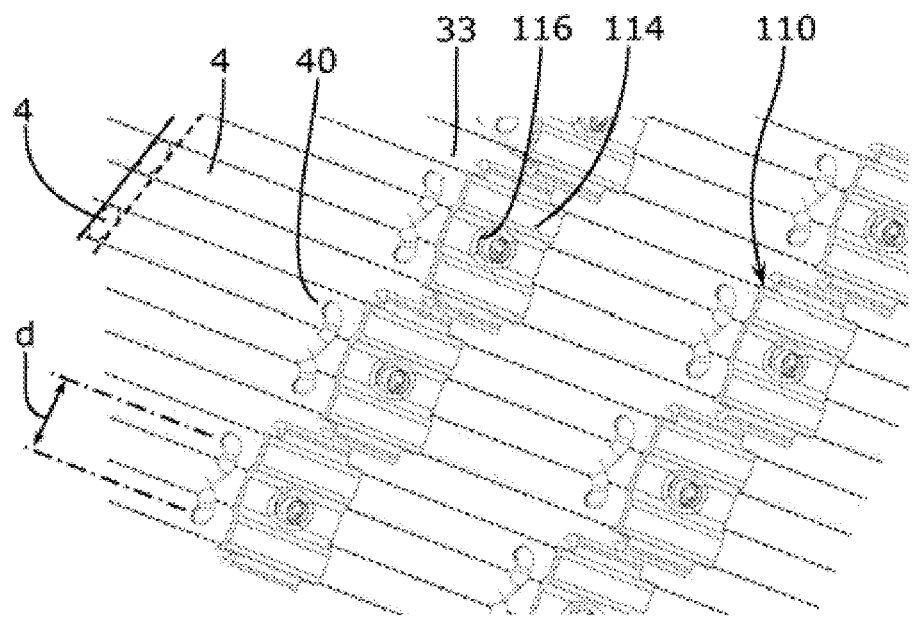
FIG. 5: a detailed bottom perspective view of the splice assembled according to this third method of realization.

FIGS. 4B and 5 illustrate views of a third embodiment which differs substantially from the second in that the retention interfaces 32 of the stud-type 301 retaining members 32 are straight, similar to the first embodiment.

Figure 6A:
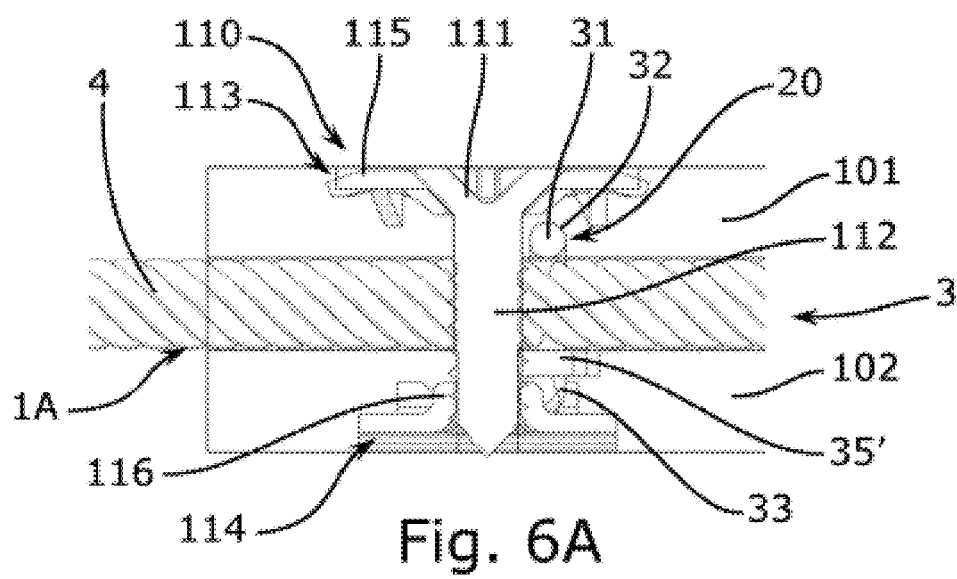
FIG. 6A: a local cross-sectional view of a support of a securing means against a retaining member according to a fourth embodiment.
Figure 6B:
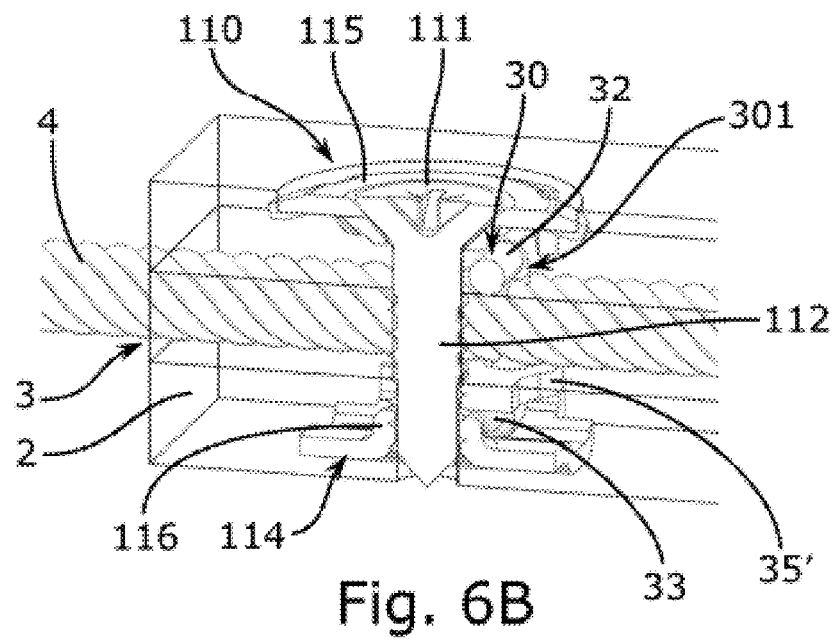
FIG. 6B: a top perspective view of the cross-sectional view of FIG. 6A.
Figure 6C:
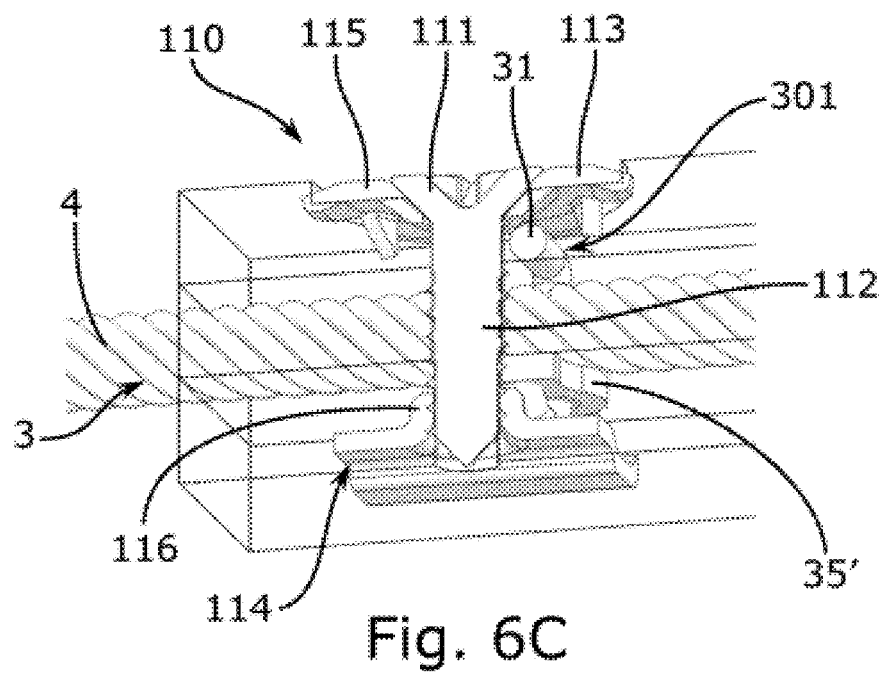
FIG. 6C: a bottom perspective view of the cross-sectional view of FIG. 6A.

FIGS. 6A, 6B, and 6C illustrate views of a fourth embodiment which differs substantially from the second in that the retention interfaces 32 of the stud-type 301 retaining members 32 are straight, similar to the first embodiment. Furthermore, each retaining member 30 comprises a lower part 35' configured to connect two anchoring members 40, in particular two anchoring tabs 33 of the same retaining member 30. Each lower part 35' is located on the side vertically opposite the side of the end portion receiving the body 31 of the shaft of the studs 301. The lower parts 35' are generally oblong in shape, having an indentation at least on a front side wall and oriented longitudinally. This indentation 320 forms a retention interface 32 complementary to that carried by the body 31 of the stud 301 and makes it possible to receive in support at least one of the securing means 110, directly or indirectly. Such an indentation 320 ensures a better distribution of the forces on the cables in which the associated retaining member is anchored. A suitable impression is provided on one side of each lower part 35' to receive at least part of each of the two anchoring tabs 33 of the stud 301, bent under the end portion 11, 12.

Figure 7:
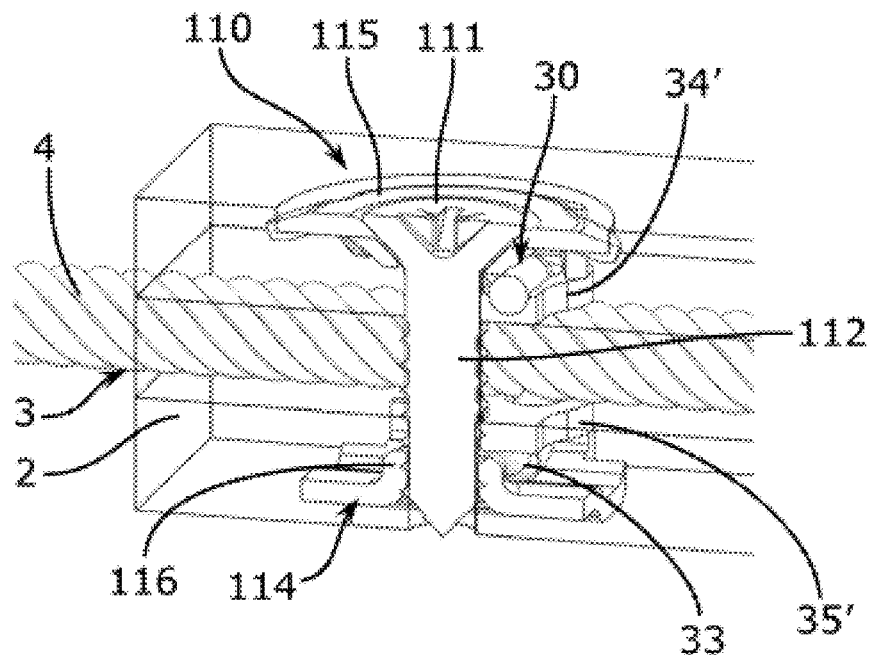
FIG. 7: a top perspective view of a local cross section of a support of a securing means against a retaining member according to a fifth embodiment.

FIG. 7 illustrates a top perspective view of a local cross section of a support of a securing means against a retaining member according to a fifth embodiment. This embodiment differs from the preceding fourth embodiment in that it comprises, in addition to a lower part 35', an upper part 34' receiving the stud 301. The functions of the lower part 35' and upper part 34' are similar to those of the lower and upper parts 34, 35 of the body 31 with reference to the embodiments described below since each retaining member 30 comprises an upper part 34 and a lower part 35 connected together by the anchoring members 40. The lower and upper parts 34, 35 of the body 31 of each retaining member 30 form inserts intended to bear down vertically on either side of the associated first end portion 11, 12 of the conveyor belt 1, in the direction of the thickness e thereof. The upper part 34' comprises an impression suitable, on one side thereof, for receiving at least a portion of the body 31 of the stud 301, whether it be straight or has an indentation 320. The presence of the upper part 34' here displaces the retention interface 32 at the lateral edge thereof. The body 31 of the retaining members 30 comprises the upper part 34' forming an insert carrying the retention interface 32.

Figure 8:
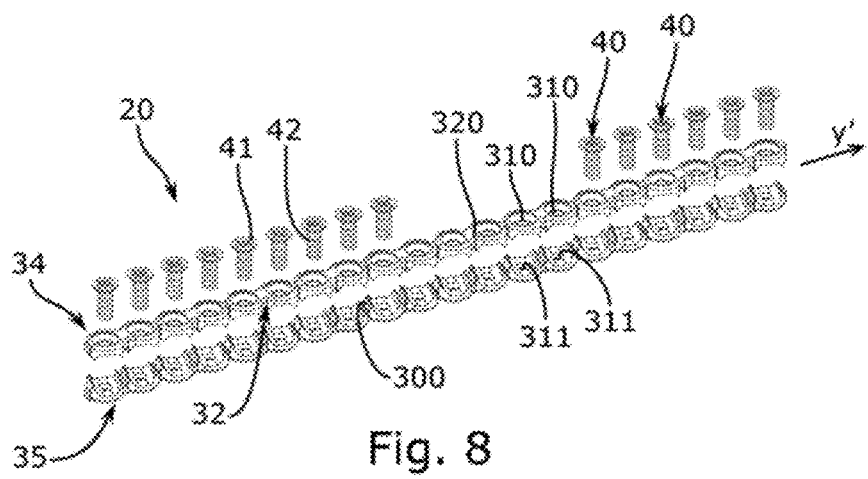
FIG. 8: A view of a frame for a splice according to a sixth embodiment.
Figure 9:
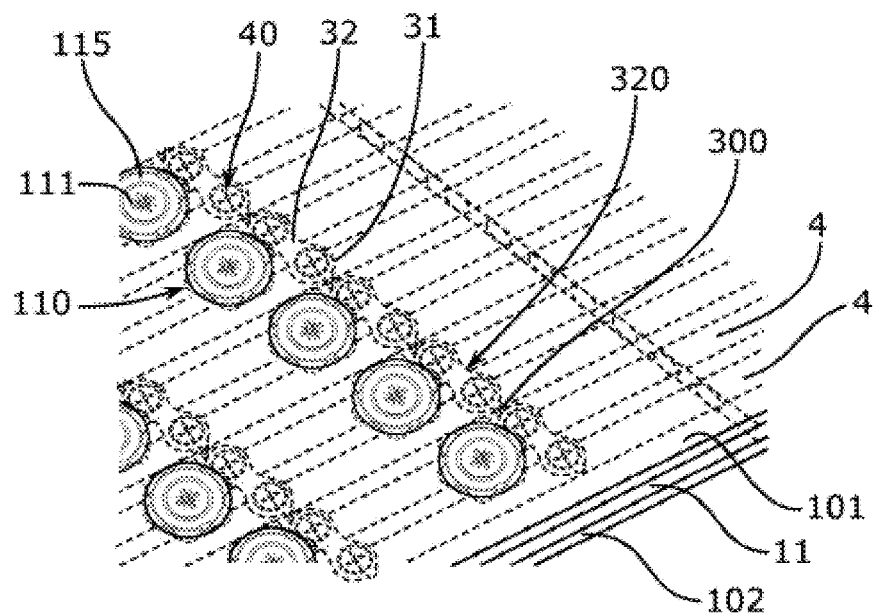
FIG. 9: a detail of a splice comprising the frame according to this sixth embodiment.
Figure 10:
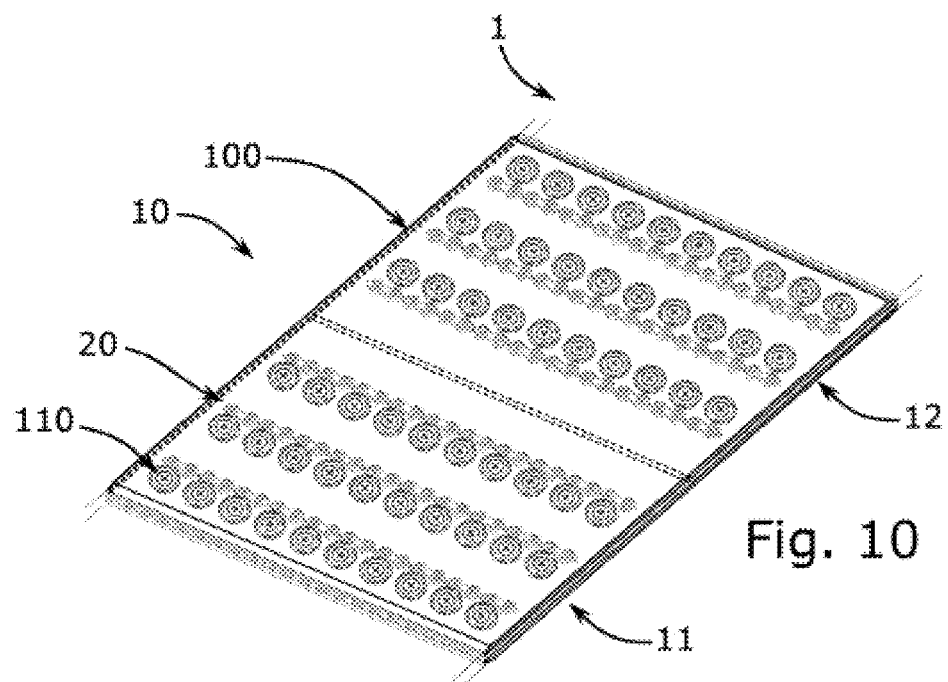
FIG. 10: a top perspective view of the splice assembled according to this sixth embodiment.

FIGS. 8, 9, and 10 illustrate views of a frame 20 for a splice 10 according to a sixth embodiment. This sixth embodiment differs substantially from the preceding embodiments in that the body 31 of each retaining member 30 comprises an upper part 34 and a lower part 35 connected together by anchoring members 40. The lower and upper parts 34, 35 of the body 31 of each retaining member 30 form inserts intended to bear down vertically on either side of the associated first end portion 11, 12 of the conveyor belt 1, in the direction of the thickness e thereof. The anchoring members 40 comprise screws provided with a head 41 and a threaded shaft at least partly forming an anchoring portion 42. The anchoring members 40 extend through the associated end portion 11, 12 vertically in the thickness thereof to connect and clamp the lower and upper body parts 34, 35 of the body 31 against each side vertically of the associated end portion 11, 12.

The upper part 34 forms an integral metal plate and comprises two recesses 310, such as countersinks, each being suitable for receiving a head 41 of one of the anchoring members 40. The lower part 35 vertically opposite the upper part 34 with respect to the associated end portion forms another integral metal plate and comprises two anchoring interfaces 311, such as threaded holes, with which each of the anchoring portions 42 of the two screw-type anchoring members 40 are suitable for cooperating.

An advantage of this embodiment is that a plurality of the retaining members 30 are connected together along a Y' axis intended to extend transversely, i.e., parallel to a transverse axis Y of the conveyor belt 1. Such a connection is preferably configured such that the length of this assembly corresponds to the width of the conveyor belt 1. In this way, the frame 20 can be quickly positioned directly by arranging a plurality of connected retaining members 30.

The retention interface 32 of each of the retaining members 30 is supported by the body 31 of said retaining members 30. The upper 34 and lower 35 parts of the retaining members 30 are generally oblong in shape, having an indentation at least on a front side wall and oriented longitudinally. This indentation 320 forms the retention interface 32 allowing at least one of the securing means 110 to be received, directly or indirectly. This support forms a reception cradle for a shaft-like securing means 110, in particular the shaft itself, minimizing relative transverse movements between the associated end portion and the splicing device 100. Preferably, the indentation 320 matches the shape of the cable it retains, for example with an angle of ⅓.

Each upper 34 and lower 35 part of the same retaining member 30 comprises tips oriented toward the end portion 11, 12 that supports it and configured to penetrate said end portion 11, 12 in order to help anchor the retaining member 30 in the body 2 of the end portion 11, 12, this being in addition to the anchoring members 40 passing through the cables 4.

The retaining members 30 each comprise two anchoring members 40 spaced apart by a distance d sufficient to ensure an anchorage on two adjacent reinforcing cables 4. This distance d is equal to a distance separating the central axes of two cables 4 from the corresponding end portion 11, 12. An integral row of a plurality of retaining members 30 is configured so that each retaining member 30 is connected to another retaining member 30 by a flexible connection 300 so as to promote troughing of the conveyor belt, namely the transverse flexibility. Such an advantage is further enhanced in the case where these connections, flexible 300 or not, are broken or separated during an operation of separating the retaining members 30, for example after a step of securing the anchoring members 40, and more generally after the step of installing the frame 20.

Figure 11:
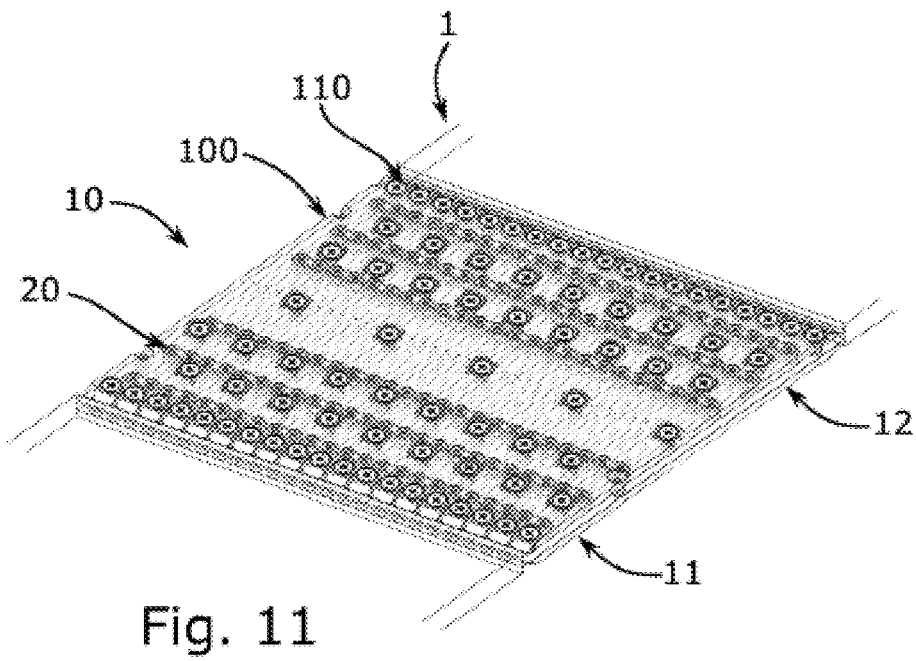
FIG. 11: A top perspective view of a splice assembled according to a seventh embodiment.

FIG. 11 illustrates a top perspective view of an assembled splice according to a seventh embodiment in which, with respect to the sixth embodiment, a row of securing means 110 is arranged so as to flank each longitudinal end of the splicing device 100 with a protective border projecting longitudinally from the first interfaces 113, in a manner comparable to the first embodiment.

Figure 12:
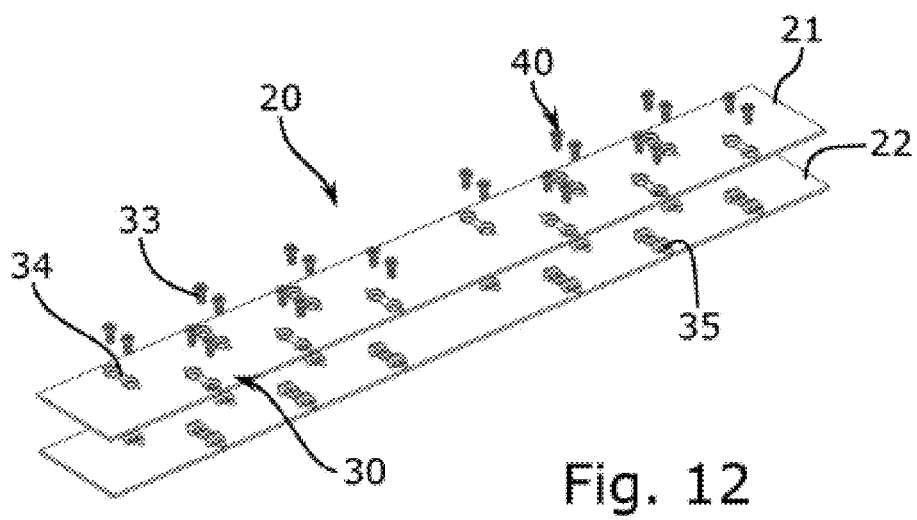
FIG. 12: A view of a support plate for a splice according to an eighth embodiment.
Figure 13:
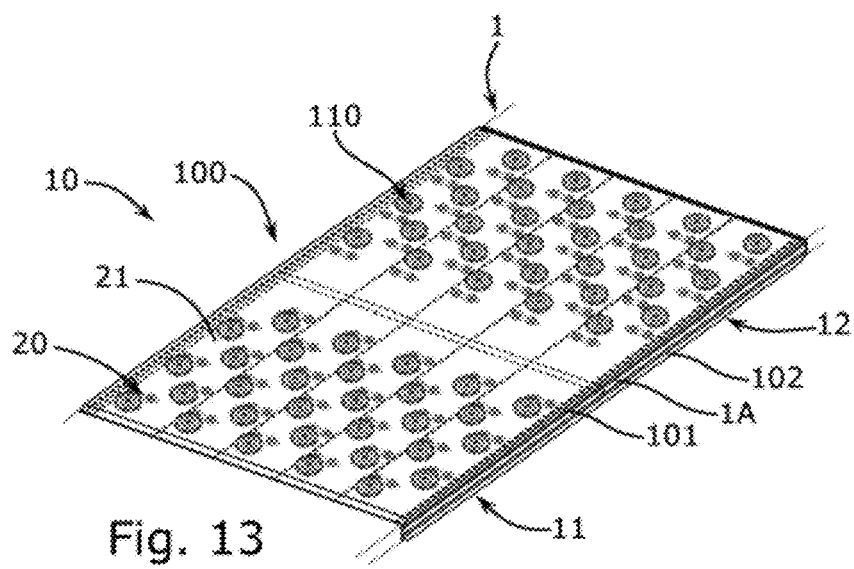
FIG. 13: a view of a splice of a conveyor belt according to this eighth embodiment.

FIGS. 12 and 13 illustrate views of support plates 21, 22 for a splice 10 according to an eighth embodiment.

This embodiment comprises retaining members 30 comparable to the sixth and seventh embodiments. However, this embodiment differs substantially from these embodiments in that the retaining members 30 are not connected together in continuous rows extending transversely across the width of the conveyor belt 1, but have support plates 21, 22 comprising a plurality of retaining members 30. The support plates 21, 22 are configured to extend longitudinally so as to cover the same side of the first end portion 11 and of the second end portion 12 of the conveyor belt 1 over at least a predetermined transverse portion, or even the entire length, of the conveyor belt incorporating a portion of the retaining members 30 so as to allow pre-positioning of said retaining members 30 when the frame 20 is installed. In particular, the frame 20 comprises:

upper support plates 21 in the form of belts which each comprise a plurality of upper parts 34 of retaining members 30 distributed in a certain pattern on or in the support plate; and lower support plates 22 in the form of belts which comprise the lower parts 35 of the retaining members 30 arranged in the same pattern as the upper parts 34 of the upper support plates 21 which are vertically superimposed so as to allow alignment of the recesses 310 with the anchoring interfaces 311 in order to screw them together.

This predetermined pattern may be configured to obtain retaining members 30 arranged in longitudinal and/or transverse alignments, alone or in groups of several, such as in pairs, in transverse alignments, i.e., in rows with longitudinal offsets such as in a staggered pattern, etc. An alternate arrangement of the inserts 34, 35 promotes troughing of the splice and also winding around the deflection rollers of the conveyor without creating a break line.

The support plates 21, 22 are preferably formed from the same material as the conveyor belt body 1. However, this may vary and said plates may comprise a body made of a flexible material and more generally of an elastomer or synthetic material. In this embodiment, the inserts 34, 35 are pre-molded from rubber, polyurethane (PU), or any other material.

In this way, the frames are in the form of support plates 21, 22 which are easy to secure to the end portions 11, 12 of the belt 1. Once the support plates are installed, it is sufficient to secure them with the anchoring members such as the screws 40. The support plates 21, 22 cover the first end portion 11 and the second end portion 12 along the entire length thereof. However, they have a narrower width than the conveyor belt 1 itself, such that a plurality of support plates 21, 22 must be connected transversely to cover the entire width of the first end portion 11 and of the second end portion 12. In this manner, support plates can be manufactured more easily. They can be made into a continuous belt, or in a large longitudinal dimension and then be cut to the desired length. Depending on the width of the support plates, it is also possible to easily adapt to the width of belt 1.

Figure 14:
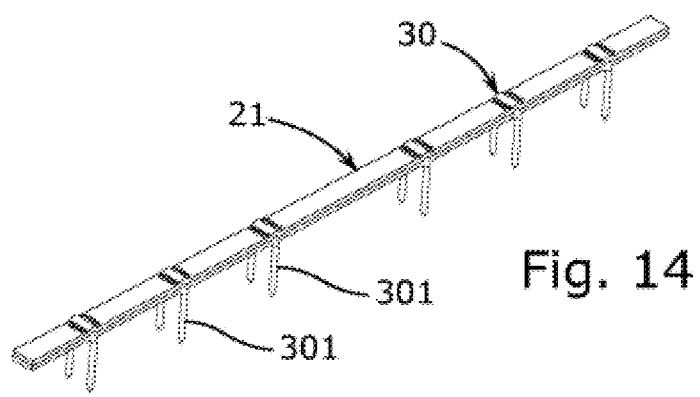
FIG. 14: A view of a support plate for a splice according to a ninth embodiment.

FIG. 14 illustrates a view of a support plate 21 for a splice according to a ninth embodiment. This support plate is in the form of a longitudinal connection of a plurality of retaining members 30. A single upper support plate 21 connects a plurality of studs 301. It should be noted that various materials can be used to form the support plate, such as a more flexible material like leather or a textile reinforcement.

The manufacture of a conveyor belt 1 splice 10 according to the invention is therefore particularly simple and generally comprises the following steps:

stripping an upper part and a lower part of the body 2 of the conveyor belt at the first end portion 11 and at the second end portion 12 of the conveyor belt 1, so as to obtain a stripped central layer 1A provided with the ends of the cables;

installing at least one splice frame 20 attached to the first end portion 11 and the second end portion 12 of the conveyor belt 1;

installing the splicing device 100 so as to join the first and second end portions 11, 12 of the conveyor belt 1.

In summary, such a splice makes it possible to limit the preparation of the end portions to only the removal of the upper and lower coverings of the belt to result in a thinned end portion corresponding to the central layer, thus facilitating the implementation.

The use of such a frame according to the invention makes it possible to create or recreate a weft by means of the retention interfaces 32, between each cable or in another configuration, for example every other cable, for the flexibility of the connection and depending on the belt strength, by crossing the cables with the aid of the anchoring members 40.

Furthermore, such a frame is compatible with the use of a splicing device known from the prior art, facilitating the supply for users and reducing the costs.

During assembly, clamping the securing means 110 of the splice in the end portions comprising the cables is sufficient to secure the frame to the end portions of the conveyor belt. Slippage is then limited as the secured connection abuts the frame created with the retention interfaces when a tensile force is applied to the conveyor belt.

By combining the clamping force of the securing means 110 of the splicing device 100 and the support of the screws on the frame, a connection sufficient to resist the desired forces is obtained.

Of course, the invention is described in the foregoing by way of example. It is understood that a person skilled in the art is capable of implementing different embodiments of the invention without going beyond the scope of the invention.

For example, it is understood that securing means or anchoring means other than screws may be used while providing the same function. Furthermore, the vertical orientations of the retaining members and/or securing means may be different, in which case the direction thereof is reversed with respect to the figures.

Finally, the term "transverse" in conjunction with the edge of the frame, or of the splicing plate, is to be understood as extending, once the splicing device has been assembled with the ends of the belt, from one side to the other of the conveyor belt and traversing the width thereof. This does not limit the invention to an arrangement of the splicing plates perpendicularly to the conveyor belt, the splice being perfectly able to have an angle different from 90° with respect to the longitudinal axis.

It is emphasized that all of the features, as they become apparent to a person skilled in the art from the present description, the drawings, and the appended claims, even if they have only been described in relation to other identified features, both individually and in any combination, may be combined with other features or groups of features disclosed herein, provided that this has not been expressly excluded or technical circumstances make such combinations impossible or meaningless.

The invention claimed is:

1. A splice frame intended to be attached to at least a first end portion of a conveyor belt of a type comprising a body made of flexible material, inside of which is housed a reinforcement comprising cables, the splice frame comprising:
retaining members having at least one body configured to extend at least partially transversely with respect to the conveyor belt and anchoring members configured to engage with at least part of the cables through a thickness of the first end portion so as to secure the body of the retaining members to the first end portion of the conveyor belt,
wherein
the retaining members comprise a retention interface for retaining one or more fasteners of a splicing device intended for splicing the first end portion with a second end portion of the conveyor belt when the first and second end portions are arranged between two splicing plates of the splicing device secured together by said one or more fasteners, and
the retention interface is configured to retain the one or more fasteners when a tensile force is applied between the splicing device and the conveyor belt.

2. The splice frame according to claim 1, wherein the anchoring members each comprise a shaft configured to pass through the first end portion.

3. The splice frame according to claim 1, wherein the retention interface of at least some of the retaining members is supported by the body of said retaining members.

4. The splice frame according to claim 1, wherein at least a plurality of the retaining members is connected together along an axis intended to extend transversely with respect to the conveyor belt.

5. The splice frame according to claim 1, further comprising:
at least one support plate configured to cover at least part of a side of the first end portion and of the second end portion of the conveyor belt,
wherein the support plate comprises at least some of a plurality of retaining members arranged in a staggered pattern.

6. The splice frame according to claim 1, wherein a distance separating two anchoring members of a retaining member is configured to correspond to a distance separating two cables of the first end portion of the conveyor belt.

7. The splice frame according to claim 1, wherein at least some of the anchoring members of at least some of the retaining members comprise studs having anchoring tabs located in an extension of the associated body, with each stud being formed in one piece.

8. The splice frame according to claim 1, wherein the body of the retaining members comprises at least one of an upper part or a lower part connected together by the anchoring members, the lower and/or upper parts of the body of the retaining members being intended to come from one side or the other of the first end portion of the conveyor belt, according to the thickness of the first end portion of the conveyor belt.

9. The splice frame according to claim 8, wherein a first of the two parts constituted by the upper part and the lower part of the body of the retaining member comprises at least one configured to receive a head of one of the anchoring members, and a second of the two parts comprises at least one anchor interface with which an anchoring portion of said anchoring member is configured to cooperate.

10. A conveyor belt splice extending along a longitudinal axis comprising a body made of flexible material, inside of which is housed a reinforcement comprising cables extending at least partially axially, wherein
the conveyor belt comprises a first and a second end portion connected together by a splicing device comprising at least two splicing plates each covering a separate side of the first and second end portions of the conveyor belt, such that the first and second end portions of said conveyor belt are arranged between the two splicing plates, with the splicing plates being secured together by one or more fasteners,
the conveyor belt splice comprises at least one splice frame attached to the first end portion and the second end portion,
the splice frame comprises retaining members having at least one body configured to extend at least partially transversely with respect to the conveyor belt and anchoring members configured to engage with at least part of the cables through a thickness of the first end portion so as to secure the body of the retaining members to the first end portion of the conveyor belt,
the retaining members comprise a retention interface for retaining the one or more fasteners of the splicing device when the first and second end portions are arranged between the two splicing plates of the splicing device secured together by said one or more fasteners, and
the retention interface is configured to retain the one or more fasteners of the splicing device when a tensile force is applied between the splicing device and the conveyor belt.

11. A method of manufacturing a conveyor belt splice, comprising:
stripping an upper part and a lower part of a body of a conveyor belt at a first end portion and a second end portion of the conveyor belt;
attaching a splice frame to the first end portion and the second end portion of the conveyor belt, wherein the splice frame comprises retaining members having at least one body configured to extend through a thickness of the conveyor belt so as to secure the at least one body of the retaining members to the first end portion of the conveyor belt and anchoring members configured to engage with cables extending at least partially axially within the first end portion of the conveyor belt, and
installing a splicing device so as to join the first end portion and second end portion of the conveyor belt,
wherein
the splicing device comprises at least two splicing plates and one or more fasteners, the at least two splicing plates are configured to cover a separate side of the first end portion and the second end portion of the conveyor belt with the first end portion and the second end portion of the conveyor belt arranged between the at least two splicing plates, and the at least two splicing plates are secured together by the one or more fasteners of the splicing device,
the retaining members comprise a retention interface for retaining the one or more fasteners of the splicing device when the first end portion and the second end portion of the conveyor belt are arranged between the two splicing plates of the splicing device and secured together by the one or more fasteners, and the retention interface is configured to retain the one or more fasteners of the splicing device when a tensile force is applied between the splicing device and the conveyor belt.

* * * * *